United States Patent [19]
Herubel

[11] 3,735,450
[45] May 29, 1973

[54] DEVICE FOR FASTENING THE ENDS OF TUBES WHICH SUPPORT ELEMENTS FOR PROCESSING TEXTILE FIBERS

[75] Inventor: Jean-Frédéric Herubel, Guebwiller, France

[73] Assignee: N. Schlumberger & Cie, Guebwiller, Haut-Rhin, France

[22] Filed: June 15, 1972

[21] Appl. No.: 262,999

[30] Foreign Application Priority Data

June 29, 1971 France....................7123620

[52] U.S. Cl..................24/31 R, 19/236, 59/78
[51] Int. Cl.............................F16g 13/00
[58] Field of Search.............19/236; 59/78; 74/249

[56] References Cited

UNITED STATES PATENTS 324,734 8/1885 Seldner....................74/249
937,663 10/1909 Wakefield..................59/78

Primary Examiner—Donald A. Griffin
Attorney—David Toren, Bernard X. McGeady and Leo Stanger

[57] ABSTRACT

A device for fastening on two driving chains the longitudinally split ends of tubes for supporting elements employed for processing textile fiber, wherein the device is constituted by a coupling member comprising two elements slidably mounted within the ends of two successive supporting tubes and joined together by a connecting element, one portion of the said member which projects from the extremities of the said supporting tubes being engaged on extensions of the pivot-pins of two links of the corresponding chain while a detachable locking member engaged on the said portion of the coupling member forms an axial distance-piece between the end faces of the extremities of the said supporting tubes and the corresponding chain-link face.

5 Claims, 3 Drawing Figures

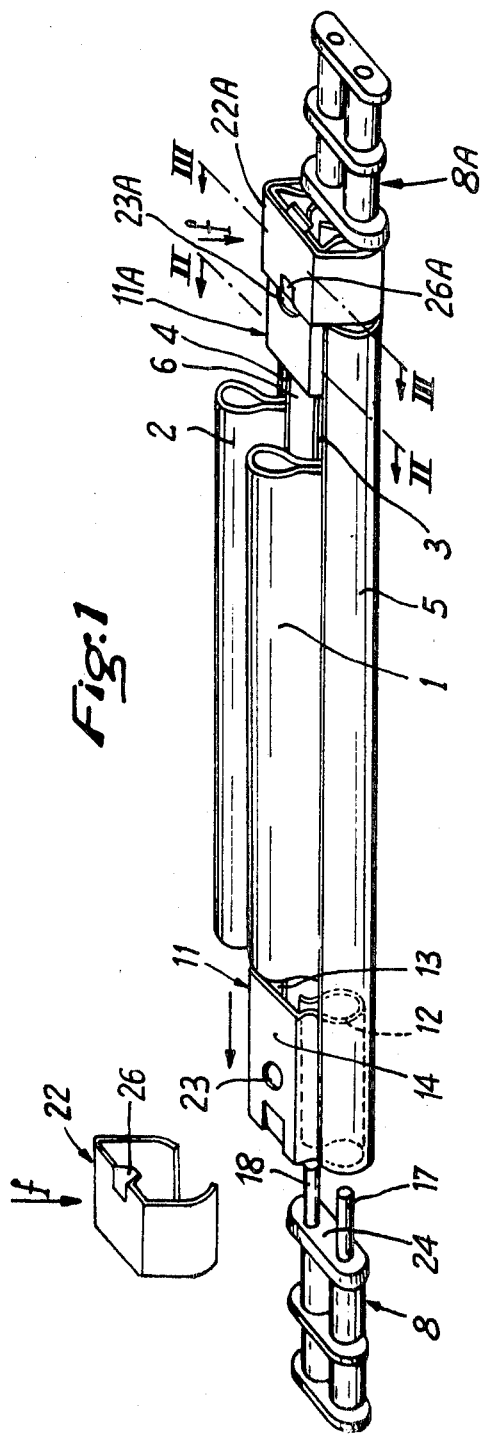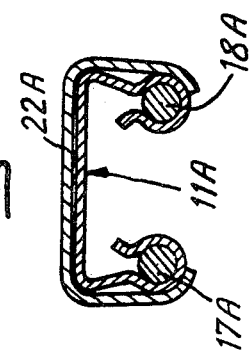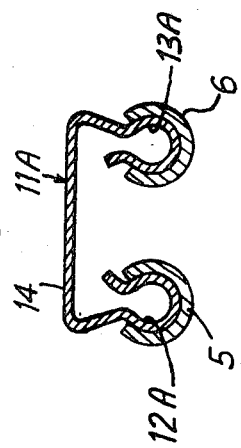

3,735,450

DEVICE FOR FASTENING THE ENDS OF TUBES WHICH SUPPORT ELEMENTS FOR PROCESSING TEXTILE FIBERS

This invention is concerned with means for fastening on two driving chains the longitudinally split ends of tubes for supporting elements employed for processing textile fibers.

Tube systems of this type for supporting flexible elements used in the processing of textile fiber have been described, for example, in American patent application Ser. No. 51,912 as filed on July 2, 1970 and now U.S. Pat. No. 3,694,860 issued Oct. 3, 1972 and entitled : "Device with flexible elements for processing textile fibers."

Each flexible element for processing textile fiber is constituted, for example, by a tubular flexible member which is flattened in such a manner that its cross-section has a shape which is close to that of a figure "8" and consequently determines two hollow lobes, one of which is the fiber-processing lobe and the other is a fastening lobe which is inserted through a longitudinal mounting slot in a supporting tube and maintained applied against the internal wall of the said tube by a locking rod placed in the bottom of the said fastening lobe, the width of the longitudinal slot of the supporting tube being smaller than the external diameter of the fastening lobe fitted with its locking rod.

In the patent aforesaid, the means which were mentioned for fastening the ends of the said supporting tubes consisted of two diametrically opposite longitudinal fastening slots formed in each tube extremity and engaged over a tongue which serves to retain the said supporting tube and is equal in width to the external diameter of the tube while a sliding sleeve fitted over the extremity of the said tube embraces the said tongue.

In point of fact, this design solution is attended by a number of disadvantages and, in particular :

a. The formation of the longitudinal fastening slots is a relatively difficult matter and calls for a number of machining operations. MOreover, if these slots are not located strictly in diametrically opposite relation to the longitudinal slot for mounting the flexible element, the tube is unserviceable and this consequently increases the overall cost price of supporting tubes.

b. The tongues employed for retaining the supporting tubes are fixed on special links of the driving chains, with the result that these latter cannot be standard chains but must on the contrary be specially made and this obviously increases their cost price.

c. The tongues for retaining the supporting tubes are riveted on special links of the driving chains and this is not only a time-consuming operation but entails the need for special tooling equipment, which also increases the capital cost of the unit as a whole. A further danger arises from the fact that the riveting may not be perfectly executed and that the joint may consequently fail during operation, whereas any lack of operational safety cannot be tolerated in modern machines which rotate at high speeds.

d. Provision is made for a fairly large number of parts and particularly of special and complicated parts which constitute the fastening device aforesaid, with the result that the assembly is expensive, complicated, takes a long time to assemble and is unreliable.

e. The stresses applied to the flexible fiber-processing elements are transmitted to the driving chains by means of a set of parts which are more or less robust and are liable to be deformed, with the result that they can no longer work under excellent conditions, which may in turn lead to premature wear of components and even to failure of the apron assembly which is formed by the flexible elements.

f. The sliding sleeves which are fitted over the ends of the supporting tubes and embrace the retaining tongues constitute more or less reliable locking means since they are liable to move and consequently to detach the flexible element from its chain, which can cause very substantial damage and stoppage of the machine over a long period of time. This is a further aspect of unreliable operation which cannot be tolerated in machines which are in use at the present time.

The aim of the invention is to provide a fastening device which is not attended by the above-mentioned disadvantages of the known system referred-to in the foregoing.

To this end and in accordance with the invention, the fastening device is constituted by a coupling member comprising two elements slidably mounted within the ends of two successive supporting tubes and joined together by a connecting element, one portion of the said member which projects from the extremities of the said supporting tubes being engaged on extensions of the pivot-pins of two links of the corresponding chain while a detachable locking member engaged on the said portion of the coupling member forms an axial distance-piece between the end faces of the extremities of the said supporting tubes and the outer face of the corresponding chain link.

The design which has just been outlined offers a whole series of advantages and, in particular:

a. The engagement of the coupling member within the supporting tubes makes it possible to dispense with the longitudinal fastening slot in these tubes, thus avoiding the need for a long and delicate machining operation and for rejection of parts as a result of inaccurate positioning of the said slot since this latter no longer exists. The cost price of supporting tubes is therefore appreciably reduced.

b. By reason of the fact that the coupling members are engaged over the link-pins of the driving chain, provision need no longer be made for specially designed and consequently very costly chain-links as was necessarily the case up to the present time; on the contrary, the entire chain is made up of very inexpensive components of standard type.

c. Since the connection between the supporting tubes and the driving chains is provided by means of coupling members and no longer by means of sets of parts riveted on the said chains, it has been possible to eliminate all riveting operations. The result thereby achieved is, on the one hand, a substantial reduction in cost price of an apron having flexible lips and, on the other hand, the removal of any danger of breakdown resulting from low strength, and even of failure of riveted joints.

d. The number of parts, and in particular special parts, which are required for this fastening system is very small and the assembly is consequently simple, inexpensive and reliable.

e. By reason of the fact that the coupling members engage directly over the link-pins of the driving chains, the stresses applied to the chains by the flexible fiber-processing elements are also transmitted directly to the said link-pins, with the result that the chains and all the ancillary elements are caused to work under the best possible conditions, that any danger of breakdown or damaging of intermediate components is prevented and that a higher degree of operational safety is therefore conferred on the assembly.

f. The members which serve to lock the supporting tubes with respect to the driving chains do not permit any displacement of any parts whatsoever, with the result that the assembly is always securely locked in position, thereby ensuring a high degree of reliability of the machine.

A better understanding of the invention will be obtained from a perusal of the following description and from a study of the accompanying drawings which show by way of non-limitative example one embodiment of a device according to the invention for fixing a tube which supports flexible elements for processing textile fiber.

In these drawings:

FIG. 1 is a partially exploded view in perspective of an assembly consisting of two flexible elements which are fastened to their driving chains by means of a device according to the invention;

FIGS. 2 and 3 are transverse sectional views taken respectively along the planes II—II and III—III of FIG. 1.

The two flexible elements 1, 2 are of the type described in the American patent application cited in the foregoing and are accordingly constituted in each case by a tubular flexible member which is flattened in such a manner that its cross-section has a shape which is close to that of a figure "8" and consequently determines two hollow lobes, one of which is a fiber-processing lobe as shown in the drawing. The other lobe is a fastening lobe and is inserted through a longitudinal mounting slot 3, 4 formed respectively in a supporting tube 5, 6, said lobe being maintained applied against the internal wall of said tube, for example by means of a locking rod (not shown) which is housed in the bottom of the said fastening lobe. It is readily apparent that, in order that the flexible element should be retained within the tube, the width of the longitudinal slot of the said tube must be smaller than the external diameter of the fastening lobe fitted with its locking rod.

The two tubes 5 and 6 are of slightly greater length than the flexible elements 1 and 2 which are carried by these latter, with the result that the tube extremities are left free and can conveniently be attached to links such as 8, 8A which form part of two chains for driving the said flexible elements.

The invention is directed to means for fastening the ends of the tubes on the said chain links. With this objective, provision is made for identical means at both ends respectively of the said tubes and the same components are designated by the same reference numerals but followed by the index A in the case of the components shown on the right-hand side of the figure.

Each fastening device comprises a coupling member 11 constituted in this example by a rectangular metal plate which is suitably bent so as to form two resilient clips 12, 13 of substantially cylindrical shape, the said clips being capable of sliding against the internal cylindrical surfaces of the corresponding extremities of the tubes 5 and 6 respectively and joined together by means of an element formed by the central portion 14 of the said plate. At least that arm of each clip which is joined to the connecting element 14 passes through the longitudinal slot 3 or 4 of the corresponding tube (see also FIG. 2).

By reason of the inherent elasticity of the material (metal or plastic material, for example) which forms the said coupling member, the two clips 12, 13 are constrained to open and are applied in contact made under pressure against the internal faces of the tubes, thereby ensuring an assembly without play. Moreover, the width of the clips in the necked portions thereof is substantially equal to the width of the tube slot, with the result that the said tubes cannot rotate with respect to the said coupling member and consequently with respect to each other. The link-pins of the driving chain 8 are provided with extensions 17, 18 having a diameter which is substantially equal to the internal diameter of each clip 12, 13 in order that the clip 11 may be caused to slide from the position shown in the left-hand portion of FIG. 1 towards a position in which the said clip is partially engaged over the two extensions 17 and 18 of the link-pins as shown in the case of the other clip 11A in the right-hand portion of the same figure. A correct assembly is obtained by engaging each clip 11, for example to a distance corresponding to one-half of its length over the link-pin extensions while the other half of its length remains engaged within each tube 5 and 6.

The tubes are therefore already secured to the corresponding chain links; however, during operation, the coupling members 11 and 11A might be liable in some cases to move towards each other until they escape from the link-pin extensions, thus resulting in dislocation of the assembly.

It is therefore important to lock the coupling member 11 in the axial direction. To this end, provision is made for a detachable locking member 22 having a substantially C-shaped cross-section (see also FIG. 3 which shows the corresponding member 22A) and formed, for example, of cut-out and bent metal or alternatively of plastic material. The two arms of the said member are resilient by virtue of the inherent nature of the material which constitutes this member and engage over the two opposite portions of the external cylindrical surfaces of the two clips 12 and 13 exactly between, on the one hand, the end faces of the corresponding extremities of the two tubes 5 and 6 and, on the other hand, the face 24 of the corresponding chain link 8. The two locking members 22, 22A therefore constitute distance-pieces which ensure positive axial positioning of the tubes between the two chain links 8, 8A. Provision is also made for resilient axial interlocking between the coupling member 11 and the locking member 22 which is constituted in this example by a lug 26 formed in the intermediate portion of the locking member 22 and capable of engaging in a recess or opening 23 of the connecting element 14 of the coupling member 11. In the left-hand portion of FIG. 1, there are shown separately the precise structures of the lug 26 and of the opening 23 whereas the right-hand portion shows the manner in which the lug is engaged in the opening and ensures axial locking of the coupling member 11A.

The mode of assembly is readily apparent: the two coupling members 11 and 11A are engaged in axial sliding motion within the two extremities of one pair of equipped tubes 5, 6. The assembly is presented in front of the extensions such as 17, 18 of the two pins of two links 8, 8A which form part of the two driving chains, the two coupling members 11 and 11A are caused to slide outwards until they come into contact with the outer faces such as the face 24 of the two chain links, and the two locking members 22, 22A are placed in position by exerting pressure in the direction of the two arrows *f*. The assembly is then in readiness for operation.

In order to carry out disassembly, the reverse operations are performed in the reverse order.

The advantages of this system have been set forth in detail in the foregoing description and need not be discussed further.

The invention is clearly not limited to the embodiment which has been described with reference to the drawings and which has been given solely by way of example; depending on the applications which are contemplated, modifications can accordingly be made in this embodiment without thereby departing either from the scope or the spirit of the invention.

What is claimed is:

1. A device for fastening the longitudinally split ends of supporting tubes for textile fiber control elements onto driving chains the links of which are articulated on pins formed with extensions, wherein said device comprises a coupling member having two elements slidably mounted within the ends of two successive supporting tubes, a connecting element joining said two slidable elements, said slidable elements having one portion projecting from the extremities of said supporting tubes and engaged on said extensions of two link pins of the corresponding driving chain, and a detachable locking member engaged on said coupling member and forming an axial distance piece between the end faces of the extremities of said supporting tubes and the outer face of the corresponding chain link.

2. A device according to claim 1, wherein said coupling member and said detachable locking member are fitted with associated elements for axial interlocking.

3. A device according to claim 2, wherein said axial interlocking element of said coupling member is located on said connecting element of said member.

4. A device according to claim 2, wherein said associated axial interlocking elements are constituted respectively by a projecting portion and a recess.

5. A device according to claim 1, wherein said detachable locking member is a shaped resilient clip having a substantially C-shaped cross-section.

* * * * *